United States Patent [19]

Beckstead et al.

[11] 4,397,821
[45] Aug. 9, 1983

[54] PRECIPITATION OF SYNTHETIC SCHEELITE

[75] Inventors: Leo W. Beckstead, Arvada; Paul B. Queneau, Golden, both of Colo.

[73] Assignee: Amax Inc.

[21] Appl. No.: 337,558

[22] Filed: Jan. 4, 1982

[51] Int. Cl.³ .................. C22B 34/30; C01G 41/00
[52] U.S. Cl. .................................. 423/58; 423/593; 423/61
[58] Field of Search .................. 423/593, 61, 58, 199, 423/551

[56] References Cited

U.S. PATENT DOCUMENTS

| | | | |
|---|---|---|---|
| 2,351,678 | 11/1943 | Hall | 423/58 |
| 2,388,306 | 11/1945 | Burwell | 423/58 |
| 2,962,349 | 8/1957 | Anglin | 423/58 |
| 4,313,914 | 2/1982 | Huggins | 423/598 |

OTHER PUBLICATIONS

Murray, "Tungsten Concentrate Leaching" in Woodcock, J. T. (ed.), Mining and Metallurgical Practices in Australasia, published by Australian Institute of Mining and Metallurgy, 1980, at pp. 452–454.

Primary Examiner—Brian E. Hearn
Assistant Examiner—Chung K. Pak
Attorney, Agent, or Firm—Michael A. Ciomek; Donald T. Black

[57] ABSTRACT

Synthetic scheelite (calcium tungstate) having a low sulfur content is produced in high yield from an aqueous solution of sodium tungstate, that can be contaminated with sulfate ion dissolved therein, by digesting the solution with solid calcium sulfate whereby low-sulfur calcium tungstate precipitates. The solution remaining after filtration of the calcium tungstate product can be treated with calcium sulfate to precipitate additional purified calcium tungstate or to generate a calcium tungstate-calcium sulfate mixture that can be recycled for digestion with additional sulfate-contaminated sodium tungstate solution.

11 Claims, 1 Drawing Figure

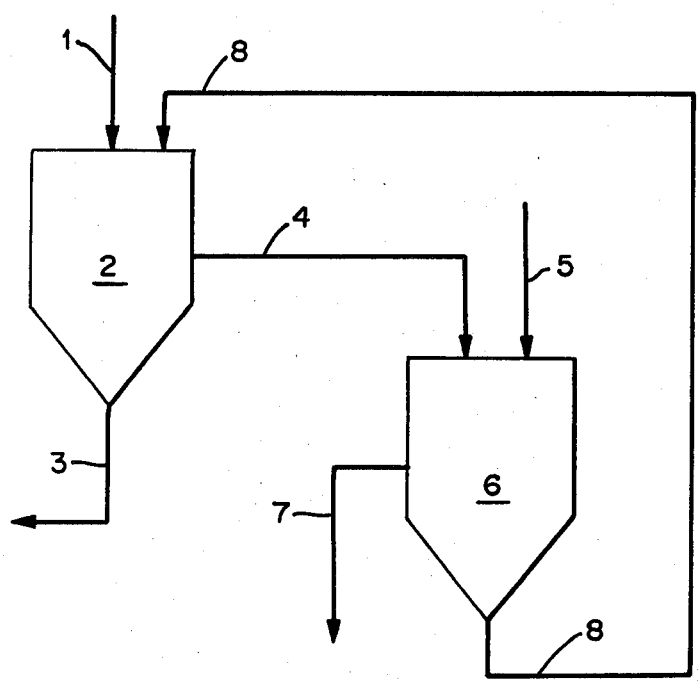

PRECIPITATION OF SYNTHETIC SCHEELITE

BACKGROUND OF THE INVENTION

1. Field of the Invention

The present invention relates to the production of synthetic scheelite, i.e., calcium tungstate ($CaWO_4$), from aqueous solutions of sodium tungstate ($Na_2WO_4$). More particularly, the present invention concerns the treatment of sodium tungstate solutions containing significant amounts of sodium sulfate dissolved therein. Such solutions are typically produced in tungsten refining operations by digestion of tungsten-bearing ore with an alkaline solution to form a raw liquor that is in turn subjected to a series of purification steps to remove contaminants that enter solution with the tungsten values. Substantial quantities of sulfate ion are introduced into the tungstate liquor through the initial digestion step and through the addition of sulfate-bearing reagents in subsequent purification steps.

It is desirable to be able to recover calcium tungstate from sodium tungstate liquors for several reasons. Calcium tungstate is a valuable commercial product in its own right, and is also used to upgrade artificially the tungsten content of the feed to a tungsten refinery. Formation of calcium tungstate from low-grade tungsten concentrates and dilute tungstate liquors that are not readily upgraded or that can be upgraded only with a significant loss of tungsten provides the tungsten values economically in a useful form.

To be a valuable commercial product for use in alloying of steel, the calcium tungstate produced from tungstate liquors must be low in sulfur; therefore, it is necessary to avoid recovering calcium sulfate in the calcium tungstate product. Presently known techniques for avoiding sulfate contamination while producing calcium tungstate typically produce chloride and sulfurous byproducts that need to be disposed of, and are also relatively difficult to control for attaining optimum calcium tungstate production at satisfactory yields with minimum sulfate contamination. Thus, there is a need for a process for producing high-purity, low-sulfur calcium tungstate from sulfate-bearing feed materials which does not produce undesirable byproducts, which is relatively easy to control, and which does not require excessive amounts of additional reagents.

2. Description of the Prior Art

The conventional method of precipitating calcium tungstate from an aqueous solution of sodium tungstate which also contains sodium sulfate is adding calcium chloride. The presence of sodium sulfate in the solution inevitably results in co-precipitation of calcium sulfate, thereby contaminating the calcium tungstate precipitate. The precipitate is therefore typically calcined with carbon at about 950° C. to reduce the calcium sulfate to calcium oxide plus a sulfur dioxide offgas. This process is unsatisfactory because it consumes large quantities of calcium chloride, and because it generates large volumes sodium chloride solution and sulfur dioxide offgas which must be disposed of. In addition, the calcium oxide byproduct dilutes the calcium tungstate product and lowers the $WO_3$ content thereof.

In one version of this process which has been published, sodium hydroxide and calcium chloride are added to an aqueous solution of sodium tungstate and sodium sulfate to precipitate about 97 percent of the tungsten in solution as calcium tungstate. The yield in this step is intentionally sacrificed in order to avoid contamination of the product with calcium sulfate. The solids are filtered off, and a slight excess of calcium chloride is then added to the filtrate to precipitate calcium tungstate and calcium sulfate. This second precipitate is recovered, and then digested in a sodium carbonate solution to convert the calcium sulfate into sodium sulfate thereby providing additional calcium tungstate product which is combined with the solid product of the first precipitation step for further treatment. This process is undesirable because it is cumbersome, it consumes large quantities of calcium chloride and sodium carbonate, and it generates a sodium chloride solution which must be disposed of.

U.S. Pat. No. 2,388,306 discloses precipitating calcium tungstate from a liquor containing sodium tungstate and sodium sulfate by adding lime to the liquor. In this process both the yield and the tungstate content of the precipitated product fall short of desirable values. The reaction of the lime with sodium sulfate produces sodium hydroxide in the liquor, thereby raising the pH of the liquor to values greater than 12, unacceptably increasing the amount of tungstate which remains in solution. In addition, the calcium tungstate product is typically diluted with unreacted lime; the patent discloses reports $WO_3$ contents of about 65.8 percent and 61.1 percent, which fall short of the theoretical maximum of about 80.5 percent.

SUMMARY OF THE INVENTION

Stated generally, the present invention is a process for producing low-sulfur calcium tungstate from an aqueous feed solution of alkali tungstate, comprising (a) slurrying in said solution a precipitant comprising finely divided calcium sulfate in an amount up to the stoichiometric amount based on the tungstate in the solution, (b) digesting the slurry formed in step (a) under conditions such that essentially all the calcium sulfate reacts with alkali tungstate, thereby forming low-sulfur calcium tungstate which is slurried in a pregnant solution containing dissolved therein alkali sulfate, and (c) separating the low-sulfur calcium tungstate formed in step (b) from the pregnant solution.

In a preferred embodiment of the present invention, the pregnant solution also contains alkali tungstate dissolved therein; and the process includes steps (a), (b) and (c) above and the additional steps of (d) slurrying the pregnant solution recovered in step (c) with a calcium ion source in an amount which is effective to provide at least the stoichiometric requirement of calcium based on the tungstate dissolved in the pregnant solution and which is effective to provide in the slurry an amount of calcium sulfate ranging from zero up to the stoichiometric amount thereof required in step (a), (e) digesting the slurry formed in step (d) under conditions such that precipitation of tungstate from the pregnant solution is maximized, thereby forming a finely divided solid product comprising calcium tungstate and, optionally, calcium sulfate, slurried in an aqueous solution of alkali sulfate, (f) filtering the finely divided solid product formed in step (e) from the aqueous solution, and (g) recycling the finely divided solid product recovered in step (f) to step (a).

BRIEF DESCRIPTION OF THE DRAWINGS

The FIGURE is a flowsheet of the preferred embodiment of the present invention.

DETAILED DESCRIPTION OF THE INVENTION

The present invention is effective to provide in high yield a purified calcium tungstate product, using as a precipitant the very compound, calcium sulfate, which constitutes the impurity that previously known calcium tungstate precipitation processes seek to avoid.

The process of the present invention can be employed to treat an aqueous alkali tungstate solution, wherein "alkali" refers to metals in Group IA of the periodic table, plus ammonium, and particularly including sodium tungstate solutions, which will be described to exemplify the invention. The solution may contain from about 5 gpl up to about 300 gpl of sodium tungstate, and solutions containing about 25 gpl to about 125 gpl of sodium tungstate as customarily encountered in tungsten refining operations can readily be treated in accordance with the present invention. Solutions can also be treated with this invention which contain sulfate, typically about 25 gpl to about 150 gpl sulfate, and more typically about 50 gpl to about 125 gpl of sulfate, as encountered in typical tungsten refining operations.

The solution to be treated, shown as stream 1 in the FIGURE, is fed to digestion stage 2 where it is slurried with a precipitant comprising calcium sulfate. The slurry can advantageously be prepared in a stirred, jacketed tank to facilitate subsequent digestion of the slurry. The precipitant should contain an amount of calcium sulfate up to the stoichiometric amount for complete reaction with the sodium tungstate in the solution to form calcium tungstate; additional amounts of calcium sulfate will report, unreacted, to the solid product and thereby dilute and contaminate the calcium tungstate. The precipitant can comprise pure calcium sulfate, a mixture of calcium sulfate with other compounds such as recycle stream 8 to be described below, or any combination thereof. The precipitant need not be subdivided to any particular degree, but should be finely divided sufficiently to permit the digestion reaction to occur within a reasonable period of time.

The slurry is then digested in stage 2 under conditions such that essentially all the calcium sulfate reacts with sodium tungstate in the solution. The pH of the slurry during digestion should generally have a value between about 9 and about 12. At lower pH values, the tungstate can tend to form condensed polytungstate compounds which can have a much higher solubility than calcium tungstate; therefore, the recovery of tungsten in the precipitated product is significantly reduced. As the pH value rises above about 9, the yield of tungstate in the precipitated product increases, the amount of dissolved tungstate left in solution in the slurry decreases, and the sulfate content of the precipitated product decreases. However, as the pH value reaches about 12 and above, precipitation of calcium hydroxide is increasingly favored at the expense of calcium tungstate precipitation, so that the yield and the tungstate content of the product suffer. In view of these considerations, the slurry pH during digestion should more advantageously be about 10 to about 11, as the yield of the process and the tungsten and sulfate contents of the precipitated product can be optimized within this range. Adjustment of the slurry pH, if necessary, can readily be made by the addition of appropriate amounts of sulfuric acid or sodium hydroxide; such pH adjustment will, however, frequently not be necessary.

The digestion reaction can be carried out in a stirred, heated tank; increasing the temperature to a point near the boiling point of the slurry (e.g. 90° C.) increases the rate of the reaction. Digestion can also be carried out at temperatures above the atmospheric boiling point of the slurry in pressure reactor equipment, if the decreased reaction time justifies the increased cost of the equipment. The slurry should be maintained under agitation during the course of the reaction, which typically proceeds for several (e.g., 1 to 3) hours. Since the calcium tungstate product forms on the particles of calcium sulfate, it is advantageous to provide attrition to the particles during the digestion to increase the exposure of fresh surfaces of calcium sulfate to the sodium tungstate in the liquor.

Following digestion, the slurry is filtered to recover solid product 3 and pregnant solution 4. It has been discovered, surprisingly, that the solid product 3 comprises calcium tungstate and only very little calcium sulfate. The calcium tungstate product 3 contains typically less than about 0.5 percent or even less than about 0.2 percent sulfur. At the same time, the calcium tungstate product 3 contains very significant amounts of tungsten, i.e. typically corresponding to at least about 70 percent $WO_3$ and more advantageously at least about 75 percent $WO_3$. The process thus produces calcium tungstate having tungsten contents approaching the theoretical maximum of about 80.5 percent $WO_3$. Pregnant solution 4 contains dissolved therein any sodium tungstate which has not reacted with calcium sulfate, and sodium sulfate which is formed in the reaction between the calcium sulfate and the sodium tungstate plus any sodium sulfate fed in stream 1.

The process described above can be carried out to precipitate in digestion stage 2 essentially all the tungstate from solution 1, but operating to that point risks excessive sulfur contamination of the product unless conditions are controlled very closely. The present invention also encompasses treatment processes in which only a portion of the tungstate is precipitated from solution 1 in digestion stage 2, leaving a pregnant solution 4 containing sodium sulfate and residual sodium tungstate values which can readily be recovered by the following treatment steps.

Following filtration to recover the calcium tungstate product 3, the pregnant solution 4 is conveyed to a second digestion stage 6. Here it is digested with a source of calcium ion 5. While a number of calcium compounds can serve as the calcium ion source 5 fed to second digestion stage 6, including lime and calcium chloride, the preferred calcium ion source is calcium sulfate because it does not introduce new ion species into the system and it participates in the precipitation reactions without becoming an inert diluent of the calcium tungstate product.

The calcium ion source should be provided in at least the stoichiometric amount for complete reaction with the tungstate in pregnant solution 4 to precipitate calcium tungstate. The maximum amount of calcium ion to supply to digestion stage 6 depends on the desired composition of the solid product of the digestion reaction, since the addition of calcium above the amount needed to precipitate tungstate will cause calcium sulfate to report to the solid product (either as a precipitate or as an unreacted precipitant). If it is desired to recover a precipitated low-sulfur calcium tungstate product, then the maximum amount of the calcium ion source should be selected so as to maximize the precipitation of calcium tungstate while minimizing the amount of calcium sulfate in the product. On the other hand, in the preferred embodiment of the present invention depicted in the FIGURE, the calcium tungstate precipitate is recycled to first digestion stage 2 described above. In this embodiment, calcium sulfate need not be present in the calcium tungstate precipitate, but its presence can be tolerated so long as the amount of calcium sulfate recycled to first digestion stage 2 does not exceed the stoichiometric requirement of calcium sulfate in digestion stage 2; thus, the amount of calcium ion to provide to digestion stage 6 in the preferred embodiment should be effective to provide in the solid product of digestion stage 6 an amount of calcium sulfate ranging from zero up to the stoichiometric amount thereof required in digestion stage 2.

The conditions under which the pregnant solution 4 and the calcium ion source 5 are digested in digestion stage 6 are selected with regard to the same considerations that govern the conditions of digestion stage 2. That is, moderately elevated temperatures on the order of 90° C. are satisfactory, and the digestion normally requires several (e.g. 1 to 3) hours to proceed to completion. This digestion step is discontinued when maximum precipitation of tungstate from the pregnant liquor has occurred. The precipitate will contain the desired amount of calcium sulfate. The resultant slurry is then filtered, providing a filtrate 7 comprising a sodium sulfate solution containing at most minimal amounts, e.g. less than about 1000 ppm and more advantageously less than about 100 ppm, of tungstate, and also providing a solid product 8 containing calcium tungstate and the desired amount of calcium sulfate. According to the preferred embodiment of this invention, the calcium tungstate-calcium sulfate product 8 is then recycled to digestion stage 2 described above, where the calcium sulfate serves as the precipitant for the tungstate values in the tungstate solution 1 fed to digestion stage 2. The overall yield of tungsten in the solid product 3, taking into account the tungsten recycled through stage 6, is normally at least about 98 percent and more advantageously at least about 99 percent. The invention is described in the following Example, which should be construed as illustrative and non-limiting.

EXAMPLE

An aqueous solution (corresponding to stream 4 in the FIGURE) containing tungsten equivalent to 25 gpl $WO_3$ (as $Na_2WO_4$) and 100 gpl $SO_4^{-2}$ ion (as $Na_2SO_4$) and having a pH of 10.0 was slurried with an amount of $CaSO_4$ calculated to provide 4.3 gpl of calcium in excess of the stoichiometric amount needed for complete reaction with the dissolved tungstate to form $CaWO_4$. The slurry was digested for four hours at 90° C. under atmospheric pressure, and then filtered. The filtrate contained substantial amounts of $Na_2SO_4$, and tungstate corresponding to only 54 ppm $WO_3$. The solid product comprised a mixture of $CaWO_4$ and $CaSO_4$, and analyzed 56.3 percent $WO_3$.

The solid product was then slurried in an aqueous solution (corresponding to stream 1 in the FIGURE) containing tungsten equivalent to 45 gpl $WO_3$ (as $Na_2WO_4$) and 100 gpl $SO_4^{-2}$ ion (as $Na_2SO_4$) and having a pH of 10.0. The slurry was digested for four hours at 90° C. under atmospheric pressure, and then filtered. The solid product comprised predominantly $CaWO_4$ with only a trace of $CaSO_4$; it analyzed 73.7 percent $WO_3$, and only 0.23 percent S. The filtrate, which contained tungsten equivalent to 33.1 gpl $WO_3$ and substantial amounts of $Na_2SO_4$, was suitable for treatment with additional $CaSO_4$ to precipitate the tungsten values.

What is claimed is:

1. A process for producing low-sulfur calcium tungstate from an aqueous feed solution of alkali tungstate, comprising
   (a) slurrying in said solution a precipitant comprising finely divided calcium sulfate in an amount up to the stoichiometric amount based on the tungstate in the solution,
   (b) digesting the slurry formed in step (a) while maintaining the pH value of the slurry between about 9 and about 12 and under conditions such that essentially all the calcium sulfate reacts with alkali tungstate, thereby forming low-sulfur calcium tungstate which is slurried in a pregnant solution containing dissolved therein alkali sulfate, and
   separating the low-sulfur calcium tungstate from the pregnant solution.

2. A process according to claim 1 wherein the pregnant solution also contains alkali tungstate dissolved therein, and further comprising subjecting the pregnant solution anew to steps (a) and (b).

3. A continuous process for producing low-sulfur calcium tungstate from an aqueous feed solution of alkali tungstate, comprising the steps set forth in claim 1, wherein the pregnant solution formed in step (b) also contains alkali tungstate dissolved therein, and further comprising
   (d) slurrying the pregnant solution recovered in step (c) with a calcium ion source in an amount which is effective to provide at least the stoichiometric requirement of calcium based on the tungstate dissolved in the pregnant solution and which is effective to provide in the slurry an amount of calcium sulfate ranging from zero up to the amount thereof required in step (a),
   (e) digesting the slurry formed in step (d) under conditions such that precipitation of tungstate from the pregnant solution is maximized, thereby forming a finely divided solid product comprising calcium tungstate and calcium sulfate, slurried in an aqueous solution of alkali sulfate,
   (f) filtering the finely divided solid product formed in step (e) from the aqueous solution, and
   (g) recycling the finely divided solid product recovered in step (f) to step (a).

4. The process of claim 1, 2 or 3 wherein the alkali tungstate in the aqueous feed solution is sodium tungstate.

5. The process of claim 1, 2 or 3 wherein the aqueous feed solution is contaminated with up to about 150 gpl $SO_4^{-2}$.

6. The process of claim 4 wherein the aqueous feed solution is contaminated with about 25 gpl to about 150 gpl $SO_4^{-2}$.

7. The process of claim 1, 2 or 3 wherein the solution slurried in step (a) contains tungstate equivalent to about 5 gpl to about 300 gpl $WO_3$.

8. The process of claim 3 wherein the calcium ion source in step (d) comprises calcium sulfate.

9. The process of claim 1, 2 or 3 wherein the low-sulfur calcium tungstate formed in step (c) contains less than about 0.5 percent S.

10. The process of claim 3 wherein the aqueous solution of sodium sulfate formed in step (e) contains tungstate equivalent to less than about 1000 ppm $WO_3$.

11. The process as described in claim 1 wherein the pH value of the slurry is maintained between about 10 and about 11.

* * * * *